United States Patent
Ahn et al.

(10) Patent No.: US 9,787,419 B2
(45) Date of Patent: Oct. 10, 2017

(54) METHOD AND APPARATUS FOR COMMUNICATION IN TDD SYSTEM

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 14/127,911

(22) PCT Filed: Jun. 28, 2012

(86) PCT No.: PCT/KR2012/005100
§ 371 (c)(1),
(2), (4) Date: Dec. 19, 2013

(87) PCT Pub. No.: WO2013/002562
PCT Pub. Date: Jan. 3, 2013

(65) Prior Publication Data
US 2014/0112217 A1  Apr. 24, 2014

Related U.S. Application Data

(60) Provisional application No. 61/501,762, filed on Jun. 28, 2011.

(51) Int. Cl.
*H04W 72/04* (2009.01)
*H04J 3/16* (2006.01)
(Continued)

(52) U.S. Cl.
CPC .......... *H04J 3/1694* (2013.01); *H04B 7/2656* (2013.01); *H04L 1/1822* (2013.01)

(58) Field of Classification Search
None
See application file for complete search history.

(56) References Cited

U.S. PATENT DOCUMENTS 7,936,731 B2    5/2011  Park et al.
2005/0201295 A1*  9/2005  Kim ..................... H04L 1/0026
                                                                370/241
(Continued)

FOREIGN PATENT DOCUMENTS

CN    1229547 A    9/1999
CN    101179415 A    5/2008
(Continued)

OTHER PUBLICATIONS

CMCC, "Discussion on 1st ABS pattern bitmap for TDD," 3GPP TSG-RAN WG 1 #63, R1-106315, Nov. 15-19, 2010, pp. 1-8.
(Continued)

*Primary Examiner* — Fan Ng
(74) *Attorney, Agent, or Firm* — Birch, Stewart, Kolasch & Birch, LLP

(57) ABSTRACT

Provided are a method and an apparatus for communication in a TDD (Time Division Duplex) system. A terminal is notified of a change in a first UL-DL setup from a base station during a first change period and receives a second UL-DL setup updated during a second change period. The terminal refreshes a buffer for an ongoing HARQ (Hybrid Automatic Repeat reQuest) process on the basis of the first UL-DL setup according to the reception of the second UL-DL setup.

12 Claims, 9 Drawing Sheets

(51) Int. Cl.
*H04B 7/26* (2006.01)
*H04L 1/18* (2006.01)

(56) References Cited

U.S. PATENT DOCUMENTS

| | | | |
|---|---|---|---|
| 2009/0086657 A1* | 4/2009 | Alpert et al. | 370/310 |
| 2009/0204862 A1 | 8/2009 | Chun et al. | |
| 2009/0300457 A1 | 12/2009 | Kuo | |
| 2011/0035369 A1 | 2/2011 | Halasipuram et al. | |
| 2011/0035639 A1 | 2/2011 | Earnshaw et al. | |
| 2011/0103288 A1* | 5/2011 | Lee et al. | 370/312 |
| 2011/0243066 A1* | 10/2011 | Nayeb Nazar | H04L 1/007 370/328 |
| 2012/0113875 A1* | 5/2012 | Alanara | H04W 72/1236 370/280 |
| 2013/0044651 A1* | 2/2013 | Wang et al. | 370/280 |
| 2013/0044652 A1* | 2/2013 | Wang et al. | 370/280 |
| 2013/0258938 A1* | 10/2013 | Sagfors et al. | 370/312 |
| 2014/0029489 A1* | 1/2014 | Han | H04L 5/001 370/280 |

FOREIGN PATENT DOCUMENTS

| | | |
|---|---|---|
| CN | 101971548 A | 2/2011 |
| CN | 102075235 A | 5/2011 |
| WO | WO 98/10540 A2 | 3/1998 |
| WO | WO 2010/086498 A1 | 8/2010 |
| WO | WO 2010/144245 A1 | 12/2010 |

OTHER PUBLICATIONS

LTE Advanced, "3rd Generation Partnership Project; Technical Specification Group Radio Access Network; Evolved Universal Terrestrial Radio Access (E-UTRA); Physical layer procedures", 3GPP TS 36.213, Release 10, V10.2.0, Jun. 2011, pp. 1-120.

LTE Advanced, "3rd Generation Partnership Project; Technical Specification Group Radio Access Network; Evolved Universal Terrestrial Radio Access (E-UTRA); Radio Resource Control (RRC); Protocol Specification", 3GPP TS 36.331, Release 10, V10.2.0, Jun. 2011, pp. 1-295.

* cited by examiner

METHOD AND APPARATUS FOR COMMUNICATION IN TDD SYSTEM

CROSS-REFERENCE TO RELATED APPLICATIONS

This application is the National Phase of PCT/KR2012/005100 filed on Jun. 28, 2012, which claims priority under 35 U.S.C. §119(e) to U.S. Provisional Application No. 61/501,762 filed on Jun. 28, 2011, all of which are hereby expressly incorporated by reference into the present application.

TECHNICAL FIELD

The present invention relates wireless communications, and more particularly, to a communication method and apparatus in a time division duplex (TDD)-based wireless communication system in which an uplink-downlink configuration is changed.

BACKGROUND ART

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The 3GPP LTE supports both frequency division duplex (FDD) and time division duplex (TDD). In the FDD, uplink (UL) transmission and downlink (DL) transmission use different frequencies. In the TDD, UL transmission and DL transmission use the same frequency. A user equipment supporting full duplex-FDD can simultaneously perform UL transmission and DL reception at a specific time. A user equipment supporting half-duplex-FDD and TDD can perform UL transmission and DL reception at different times.

In the TDD of 3GPP LTE, a DL subframe and a UL subframe coexist in one radio frame. When locations of the DL subframe and the UL subframe are predefined in the radio frame, it is called a DL-UL configuration.

In general, a wireless communication system has been designed by considering that there is almost no change when a base station uses a specific DL-UL configuration. This is because normal communication may be difficult when a mismatch occurs in the DL-UL configuration between the user equipment and the base station.

However, with the diversification of a type of a required service and with the increase in traffic, the base station needs to change the DL-UL configuration in a more flexible manner.

DISCLOSURE OF THE INVENTION

The present invention provides a communication method in a process of changing a downlink (DL)-uplink (UL) configuration, and a wireless device using the method.

In one embodiment, there is provided A communication method in a time division duplex (TDD) system. The method may comprise communicating with a base station by applying a first uplink (UL)-downlink (DL) configuration in which a plurality of DL subframes and a plurality of UL subframes are configured at different times; receiving a notification of a change in the first UL-DL configuration from the base station during a first modification period; receiving a second UL-DL configuration during a second modification period; and refreshing a buffer for a hybrid automatic repeat request (HARQ) process on the basis of the first UL-DL configuration upon receiving the second UL-DL configuration.

The buffer may be refreshed when the notification of the change in the first UL-DL configuration is received The buffer may be refreshed when the second UL-DL configuration is received At least one DL subframe may be included which is common to the first UL-DL configuration and the second UL-DL configuration. A buffer for an HARQ process mapped to the common DL subframe may not be refreshed.

At least one UL subframe may be included which is common to the first UL-DL configuration and the second UL-DL configuration. A buffer for an HARQ process mapped to the common UL subframe may not be refreshed.

In other embodiment, there is provided a user equipment in a time division duplex (TDD) system. The user equipment may comprise a radio frequency (RF) unit for transmitting and receiving a radio signal; and a processor operatively coupled to the RF unit, wherein the processor is configured for: communicating with a base station by applying a first uplink (UL)-downlink (DL) configuration in which a plurality of DL subframes and a plurality of UL subframes are configured at different times; receiving a notification of a change in the first UL-DL configuration from the base station during a first modification period; receiving a second UL-DL configuration during a second modification period; and refreshing a buffer for a hybrid automatic repeat request (HARQ) process on the basis of the first UL-DL configuration upon receiving the second UL-DL configuration.

Communication reliability can be prevented from deterioration when an uplink (UL)-downlink (DL) configuration between a base station and a user equipment is changed.

MODES FOR CARRYING OUT THE PREFERRED EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
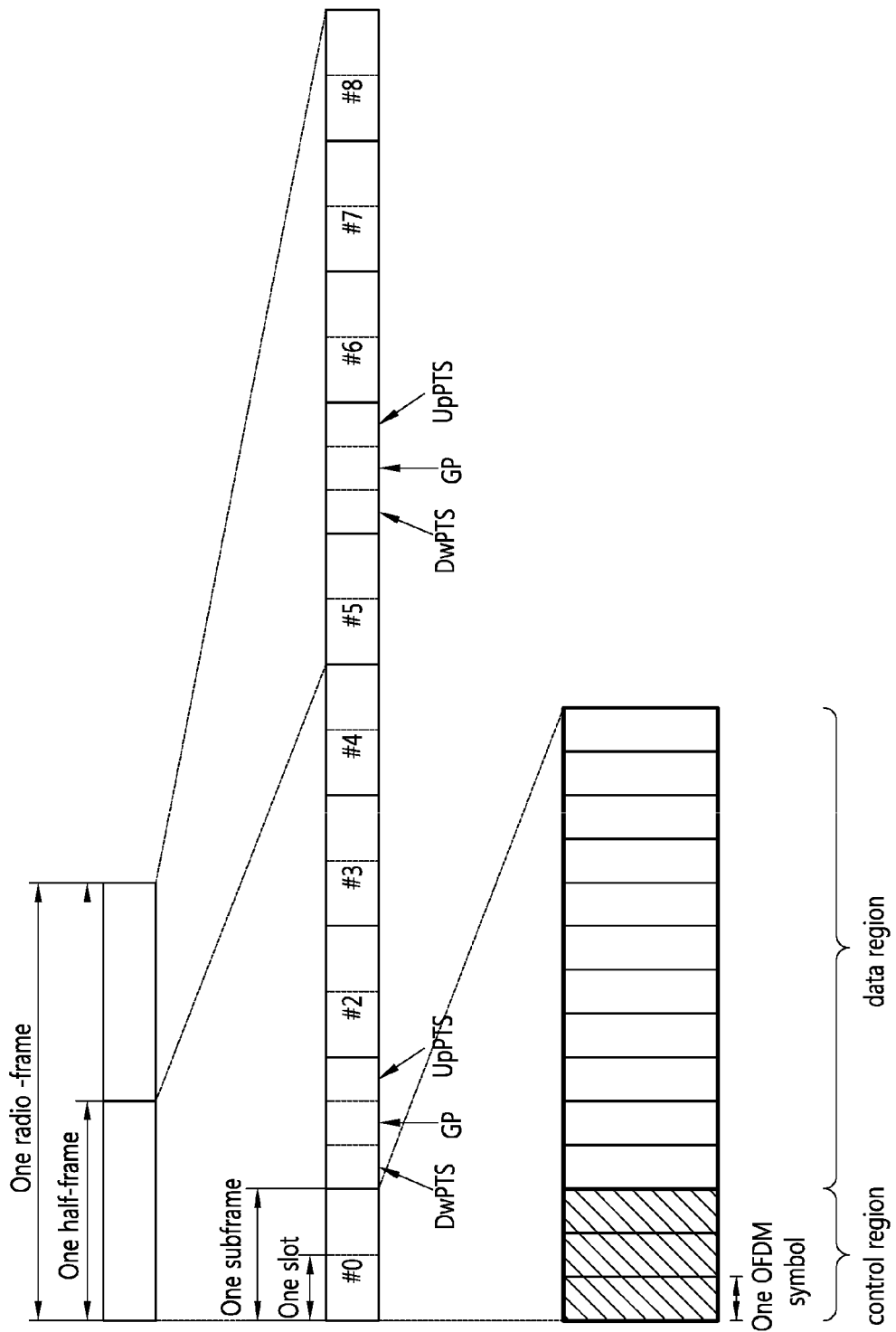
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" can be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | D | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in four preceding OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
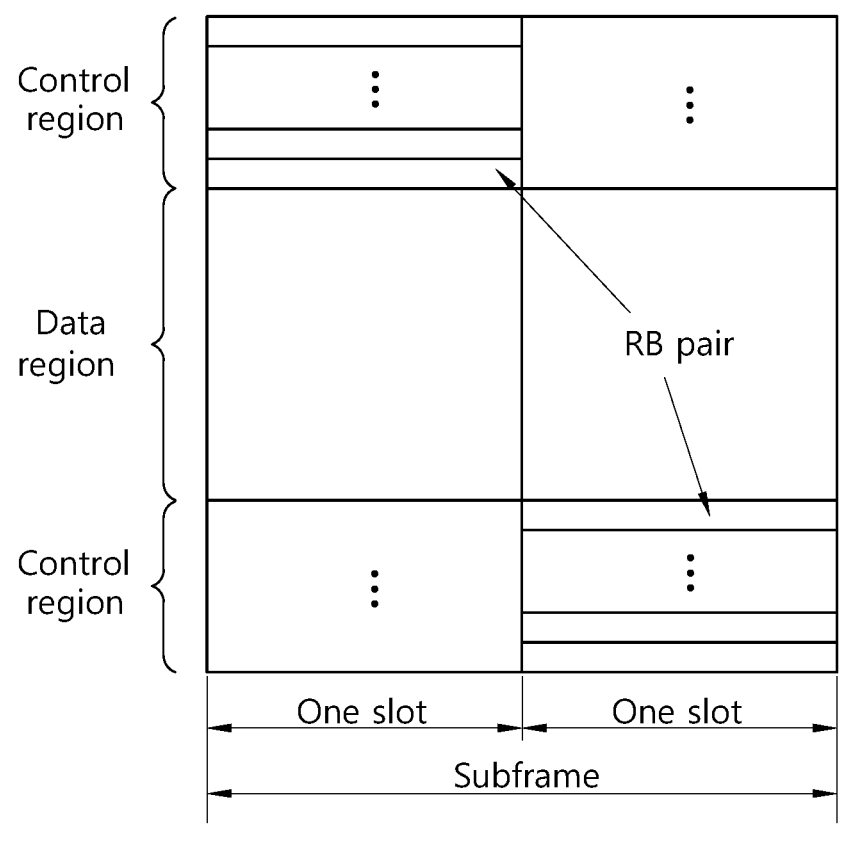
FIG. 2 shows a structure of an uplink (UL) subframe in 3GPP LTE.

FIG. 2 shows a structure of a UL subframe in 3GPP LTE.

The UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

In order to receive DL data, the UE first receives a DL resource allocation (or a DL grant) on the PDCCH. When PDCCH detection is successful, the UE reads the DCI on the PDCCH. By using the DL resource allocation in the DCI, DL data on the PDSCH is received. In addition, in order to transmit UL data, the UE first receives a UL resource allocation on the PDCCH. When PDCCH detection is successful, the UE reads the DCI on the PDCCH. By using the UL resource allocation in the DCI, UL data on the PUSCH is transmitted.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ period.

Figure 3:
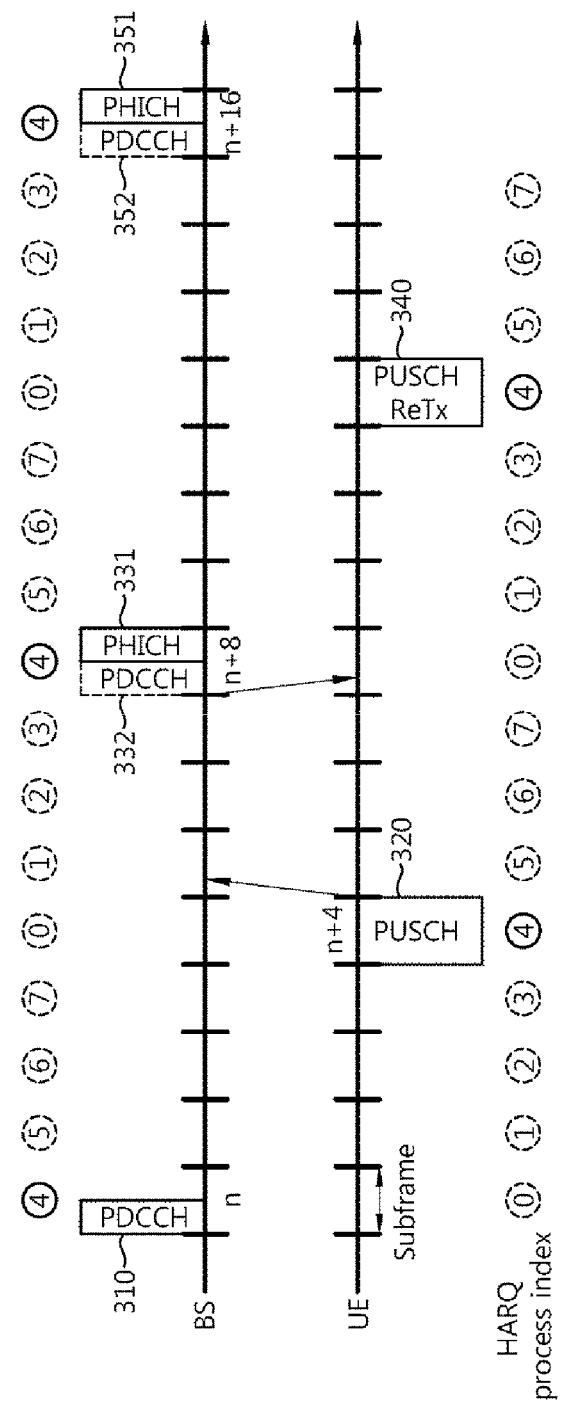
FIG. 3 shows UL synchronous hybrid automatic repeat request (HARQ) in 3GPP LTE.

FIG. 3 shows UL synchronous HARQ in 3GPP LTE.

A UE receives an initial UL grant on a PDCCH 310 from a BS in an $n^{th}$ subframe.

The UE transmits a UL transport block on a PUSCH 320 by using the initial UL grant in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL grant on a PDCCH 332, or may not send an additional UL grant.

Upon receiving the NACK signal, the UE sends a retransmission block on a PUSCH 340 in an $(n+12)^{th}$ subframe. For the transmission of the retransmission block, if the retransmission UL grant is received on the PDCCH 332, the UE uses the retransmission UL grant, and if the retransmission UL grant is not received, the UE uses the initial UL grant.

The BS sends an ACK/NACK signal for the UL transport block on a PHICH 351 in an $(n+16)^{th}$ subframe. When the ACK/NACK signal is the NACK signal, the BS may send a retransmission UL grant on a PDCCH 352, or may not send an additional UL grant.

After initial transmission is performed in the $(n+4)^{th}$ subframe, retransmission is performed in the $(n+12)^{th}$ subframe, and thus synchronous HARQ is performed with an HARQ period corresponding to 8 subframes.

In frequency division duplex (FDD) of 3GPP LTE, 8 HARQ processes can be performed, and the respective HARQ processes are indexed from 0 to 7.

In the TDD, the number of HARA processes is determined as shown in Table 2 below, according to the DL-UL configuration of Table 1.

TABLE 2

| TDD DL-UL configuration | The number of HARQ processes for normal HARQ operation | The number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

For the TDD UL-DL configurations 1 to 6 and the normal HARQ operation, the UE performs PUSCH transmission corresponding to a subframe n+k upon detection of PDCCH and/or PHICH transmission having a UL grant in a subframe n. k is given by Table 3 below.

TABLE 3

| UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   | 4 | 4 |   |
| 5 |   |   |   |   |   |   |   |   | 4 |   |
| 6 | 7 | 7 |   |   |   | 7 | 7 |   |   | 5 |

The section 8 of 3GPP TS 36.213 V8.7.0 (2009-05) regarding the DL-UL configuration 0 and the subframe bundling operation can be incorporated herein by reference.

In the FDD, it can be said that ACK/NACK carried by a PHICH received in a subframe i is associated with PUSCH transmission in a subframe i−4.

In the DL-UL configurations 1 to 6 of the TDD, it can be said that ACK/NACK carried by a PHICH received in a subframe i is associated with PUSCH transmission in a subframe i−k. k is given by Table 4 below.

TABLE 4

| UL-DL configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

The UE receives a PHICH in a subframe $n+k_{PHICH}$ in accordance with PUSCH transmission scheduled in a subframe n. In the FDD, $k_{PHICH}$ is always 4. In the TDD, $k_{PHICH}$ is given by Table 5 below.

TABLE 5

| UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In a subframe $n+k_{PHICH}$, the UE identifies a PHICH resource by using an index pair ($n^{group}_{PHICH}$, $n^{seq}_{PHICH}$). A PHICH group index $n^{group}_{PHICH}$ has a value in the range of 0 to $N^{group}_{PHICH}-1$. An orthogonal sequence index $n^{seq}_{PHICH}$ denotes an index of an orthogonal sequence.

An index pair ($n^{group}_{PHICH}$, $n^{seq}_{PHICH}$) is obtained according to Equation 1 below.

$$n_{PHICH}^{group}=(I_{PRB\_RA}^{lowest\_index}+n_{DMRS})\mod$$
$$n_{PHICH}^{group}+I_{PHICH}N_{PHICH}^{group}n_{PHICH}^{seq}=(\text{floor}$$
$$(I_{PRB\_RA}^{lowest\_index}/N_{PHICH}^{group})+n_{DMRS})\mod 2N_{SF}^{PHICH}$$

Herein, $n_{DMRS}$ denotes a cyclic shift of a demodulation reference signal (DMRS) in a latest UL grant for a transport block associated with corresponding PUSCH transmission. The DMRS is an RS used in PUSCH transmission. $N^{PHICH}_{SF}$ denotes an SF size of an orthogonal sequence used in PHICH modulation. $I^{lowest\_index}_{PRB\_RA}$ is the smallest PRB index in a first slot of corresponding PUSCH transmission. $I_{PHICH}$ has a value of 0 or 1. The number $N^{group}_{PHICH}$ of PHICH groups is a parameter configured by using higher layer signaling.

ceil(x) is a function for outputting a minimum value among integers greater than or equal to x. floor(x) is a function for outputting a maximum value among integers less than or equal to x.

Figure 4:
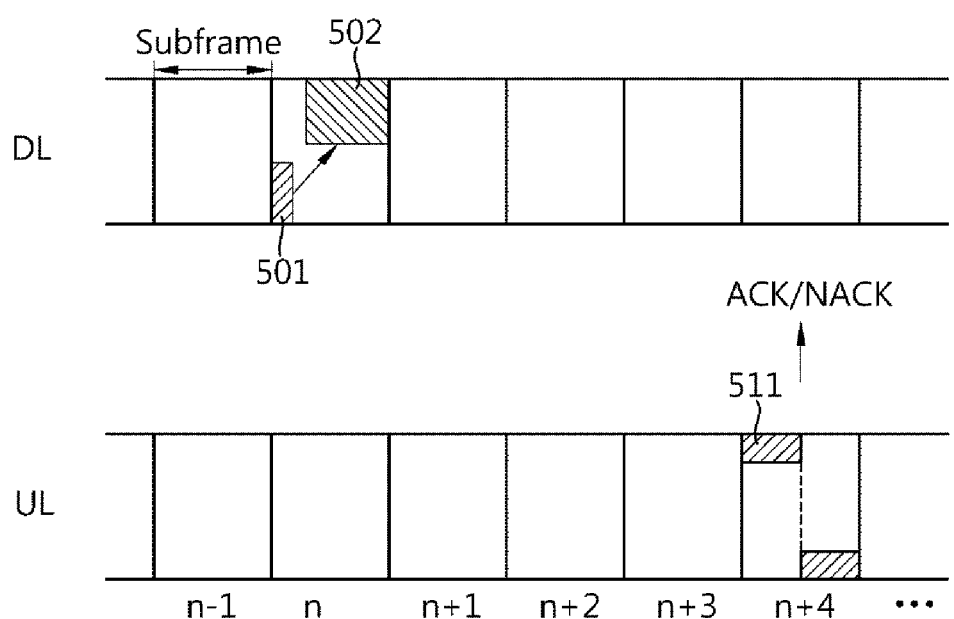
FIG. 4 shows an example of performing downlink (DL) HARQ in 3GPP LTE.

FIG. 4 shows an example of performing DL HARQ in 3GPP LTE.

By monitoring a PDCCH, a UE receives a DL resource allocation (or a DL grant) on a PDCCH 501 in an $n^{th}$ DL subframe. The UE receives a DL transport block through a PDSCH 502 indicated by the DL resource allocation.

The UE transmits an ACK/NACK signal for the DL transport block on a PUCCH 511 in an $(n+4)^{th}$ UL subframe. The ACK/NACK signal can be regarded as a reception acknowledgement for the DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a PUCCH resource for the PUCCH 511, the UE uses a resource allocation of the PDCCH 501. The PUCCH resource is determined based on a lowest CCE index (or an index of a first CCE) used for transmission of the PDCCH 501. An index used to determine the PUCCH resource is called a resource index.

Unlike frequency division duplex (FDD), a UL subframe and a DL subframe coexist in one radio frame in TDD. In general, the number of UL subframes is less than the number of DL subframes. Therefore, UL subframes for transmitting an ACK/NACK signal are insufficient, and thus it is supported to transmit a plurality of ACK/NACK signals for a plurality of DL transport blocks in one UL subframe. According to the section 10.1 of 3GPP TS 36.213 V8.7.0 (2009-05), two ACK/NACK modes, i.e., channel selection and bundling, are introduced.

First, bundling is an operation in which ACK is transmitted when decoding of all PDSCHs (i.e., DL transport blocks) received by a UE is successful, and otherwise NACK is transmitted.

Second, channel selection is also called ACK/NACK multiplexing. The UE transmits ACK/NACK by selecting a plurality of reserved PUCCH resources.

Table 6 below shows a DL subframe n-k associated with a UL subframe n depending on the UL-DL configuration in 3GPP LTE. Herein, k∈K, where M is the number of elements of a set K.

TABLE 6

| UL-DL configu- ration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the UL-DL configuration 5, the UL subframe 2 is associated with 9 DL subframes {13, 12, 9, 8, 7, 5, 4, 11, 6}.

Hereinafter, a method of changing a UL-DL configuration is proposed. A network can change a UL-DL configuration according to a change in a traffic situation or an interference environment.

Figure 5:
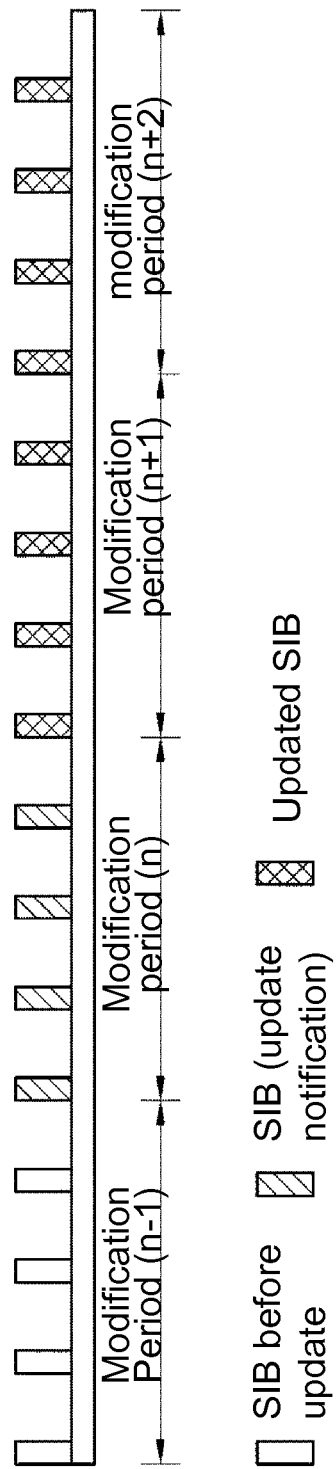
FIG. 5 shows an example of changing a UL-DL configuration according to an embodiment of the present invention.

FIG. 5 shows an example of changing a UL-DL configuration according to an embodiment of the present invention.

It is proposed to use a system information block (SIB) to change the UL-DL configuration. The SIB is one of RRC messages, and is transmitted on a PDSCH. A UE receives the PDSCH of the SIB by using a DL grant on a PDCCH identified by an SI-RNTI.

According to the section 6.3.1 of 3GPP TS 36.331 V8.7.0 (2009-09), the SIB has a type 1 to a type 13 depending on corresponding system information. The SIB type 1 includes scheduling information which defines scheduling of the remaining SIB types and an update indicator which notifies whether the SIB is updated. The scheduling information may include a transmission period of other SIBs.

To update the SIB, a modification period is defined. The modification period may include one or more radio frames or one or more subframes. The modification period may be determined by system information.

When a network partially or entirely changes the system information (MIB and/or SIB), this change is first reported to a UE. For example, it is assumed that the SIB is not changed until a modification period n−1. If the SIB is changed, the network first updates an update indicator of the SIB type 1 during a modification period n, and reports this change to the UE. For a UE in an idle state, the update notification may be transmitted by using a paging message. From a modification period n+1, the network transmits updated system information. Upon receiving an update notification, the UE may acquire new system information at a next modification period.

Assume that information related to the UL-DL configuration is included in the SIB type 1. For example, the SIB type 1 may include a configuration indicator indicating one of the UL-DL configurations 1 to 6 of Table 1. Assume that the configuration indication indicates the UL-DL configuration 1 until the modification period n−1. To change the UL-DL configuration, the network updates the update indicator of the SIB type 1 during the modification period n, and notifies the update to the UE. In addition, from the modification period n+1, the configuration indicator of the SIB type 1 may indicate the UL-DL configuration 2.

Although the UL-DL configuration is included in the SIB type 1 hereinafter for example, the UL-DL configuration may also be included in an MIB or another SIB type. Alternatively, the UL-DL configuration may also be included in a broadcast message or a multicast message.

As described above, DL HARQ timing, UL HARQ timing, or the like varies depending on the UL-DL configuration. During a time when the pre-set UL-DL configuration is changed to a new UL-DL configuration, a UL-DL configuration may be mismatched between a BS and a UE. There may be a duration in which the BS sends the new UL-DL configuration but the UE cannot apply the new UL-DL configuration yet.

Hereinafter, various operations depending on a change in a UL-DL configuration is defined.

Figure 6:
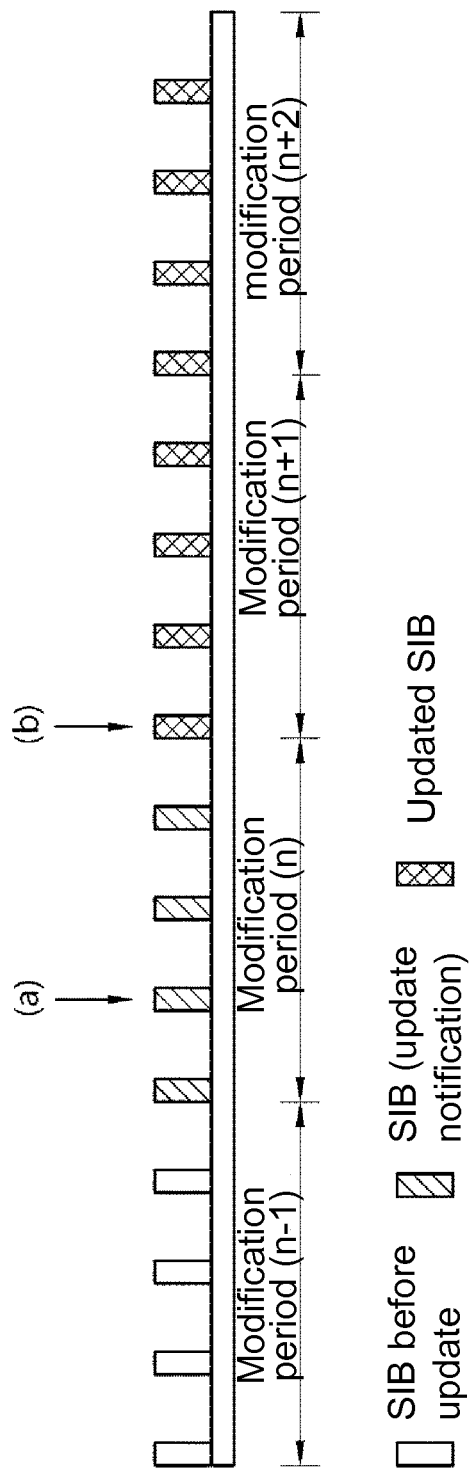
FIG. 6 is a diagram for describing a buffer management of an HARQ process depending on a change in a UL-DL configuration.

FIG. 6 is a diagram for describing a buffer management of an HARQ process depending on a change in a UL-DL configuration.

To perform DL HARQ, a UE manages a soft buffer by dividing it by the number of DL HARQ processes (of the number of DL transport blocks) that can be managed simultaneously. If the UE has a soft buffer capable of storing N bits and manages M DL HARQ processes simultaneously, about N/M bits are allocated to each HARQ process.

As shown in Table 2, the number of HARQ processes varies depending on the UL-DL configuration. If the UL-DL configuration is changed and thus the number of HARQ processes to be managed is changed, the soft buffer must be divided again. In addition, ACK/NACK transmission timing may also be changed. Therefore, it may be difficult to maintain the HARQ process managed in the previous UL-DL configuration.

The present invention proposes to fully flush the existing DL HARQ reception buffer and to refresh the HARQ process, when the UL-DL configuration is changed. Hereinafter, 'refresh' implies that the existing buffer is fully flushed or the existing buffer is newly partitioned.

A time point at which a UE refreshes an HARQ process may be a time point (indicated by (a) in FIG. 6) at which information for notifying the update of system information is first received, or may be a time point (indicated by (b) in FIG. 6) at which the updated UL-DL configuration is first received. Alternatively, the time point at which the UE refreshes the HARQ process may be a time point at which a modified UL-DL configuration is received (e.g., a start of a modification period n+1 or a start of a modification period n+2).

The UE may not refresh the entire HARQ processes, but may refresh the remaining HARQ processes other than a specific HARQ process (e.g., an HARQ process mapped to a specific DL subframe). The specific DL subframe may be a DL subframe which is common to a UL-DL configuration before an update and a UL-DL configuration after the update. For example, in the UL-DL configuration of Table 1, subframes having indices 0 and 5 are always DL subframes.

The buffer refresh may also apply to a UL HARQ. Upon receiving a modified UL-DL configuration, a UE may fully flush the existing UL HARQ transmission buffer, and may newly start an HARQ process.

A time point at which a UE refreshes a UL HARQ process may be a time point (indicated by (a) in FIG. 6) at which information for notifying the update of system information is first received, or may be a time point (indicated by (b) in FIG. 6) at which the updated UL-DL configuration is first received. Alternatively, the time point at which the UE refreshes the UL HARQ process may be a time point at which a modified UL-DL configuration is received (e.g., a start of a modification period n+1 or a start of a modification period n+2).

The UE may not refresh the entire UL HARQ processes, but may refresh the remaining HARQ processes other than a specific HARQ process (e.g., an HARQ process mapped to a specific UL subframe). The specific UL subframe may be a UL subframe which is common to a UL-DL configuration before an update and a UL-DL configuration after the update. For example, in the UL-DL configuration of Table 1, a subframe having an index 2 is always a UL subframe.

Figure 7:
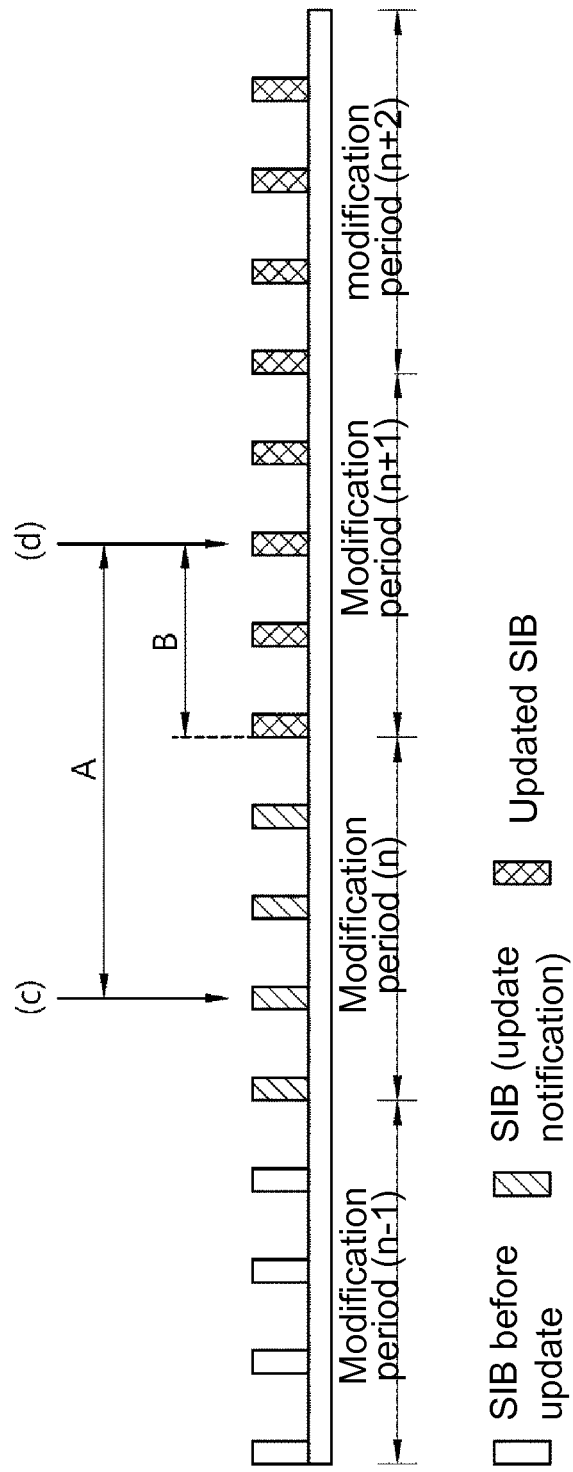
FIG. 7 is a diagram for describing scheduling management depending on a change in a UL-DL configuration.

FIG. 7 is a diagram for describing scheduling management depending on a change in a UL-DL configuration.

If the UL-DL configuration is changed, a problem may occur in DL scheduling or UL scheduling. For example, upon detecting PDCCH transmission having a UL grant at a subframe n with respect to each UL-DL configuration as shown in Table 2, the UE performs corresponding PUSCH transmission at a subframe n+k. If the UL-DL configuration is changed, to which subframe a PUSCH/PDSCH for a UL/DL grant corresponds may be ambiguous.

For example, assume that a BS transmits an update notification during a modification period n, and an update UL-DL notification is applied from a modification period n+1. However, after the modification period n+1, the BS cannot know at which modification period the UE receives an updated SIB.

Therefore, the present invention proposes to ignore a DL grant and/or a UL grant until an updated UL-DL configuration is received, when the UE receives a notification of a change in a UL-DL configuration.

A UE may ignore a UL/DL grant from a time point (indicated by (c) in FIG. 7) at which information for notifying the update of system information is first received, or may be a time point (indicated by (d) in FIG. 7) at which the updated UL-DL configuration is first received. The UE may ignore the UL/DL grant for a duration A from (c) to (d). The UE may ignore the UL/DL grant for a duration B from a start of a modification period n+1 to (d). The UE may ignore the UL/DL grant during a modification period n+1.

Figure 8:
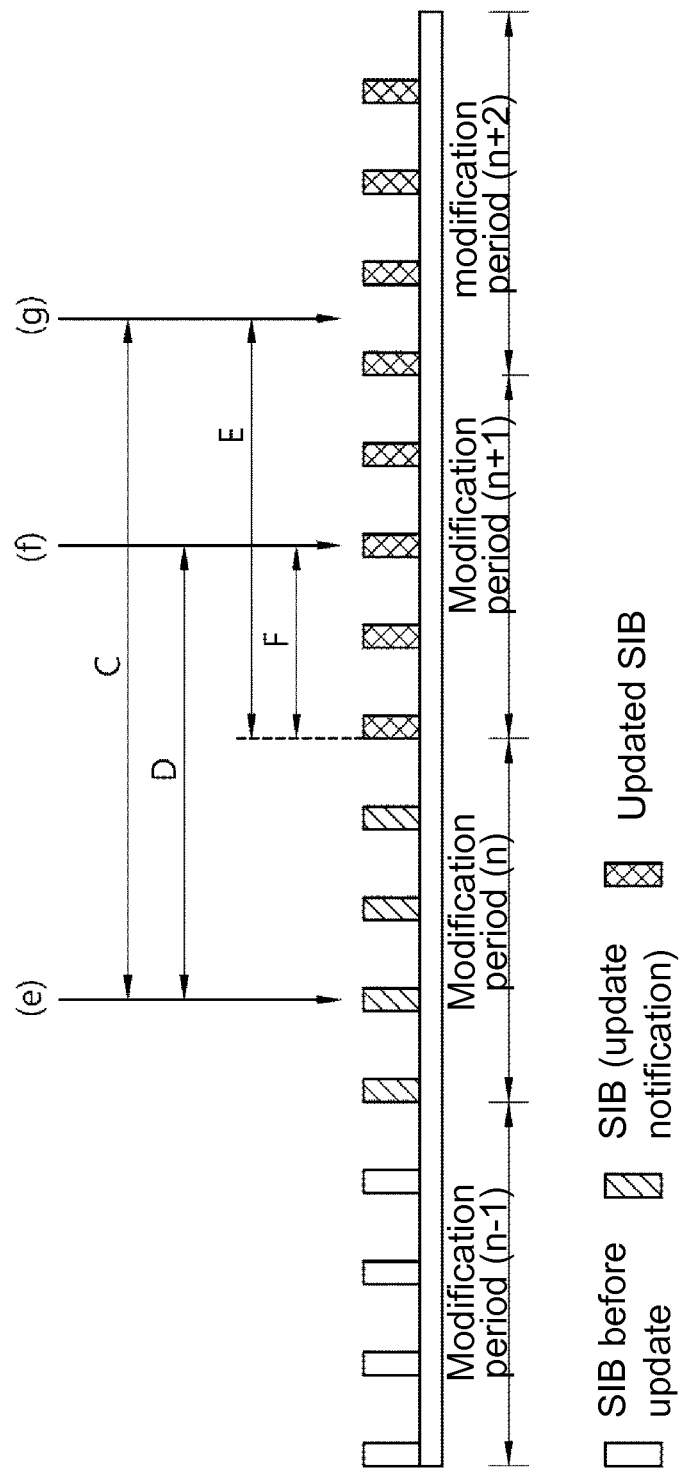
FIG. 8 is a diagram for describing a UL signaling management depending on a change in a UL-DL configuration.

FIG. 8 is a diagram for describing a UL signaling management depending on a change in a UL-DL configuration.

As the UL-DL configuration is changed, a UL signaling parameter related to the UL-DL configuration may also be changed. For example, a UL configuration for sounding reference signal (SRS) transmission, channel quality indicator (CQI) report, scheduling request (SR) transmission, random access preamble transmission, etc., may vary depending on the UL-DL configuration.

For example, assume that a BS transmits an update notification during a modification period n, and an update UL-DL notification is applied from a modification period n+1. However, after the modification period n+1, the BS cannot know at which modification period the UE receives an updated SIB.

The present invention proposes to stop transmission of UL signaling during a specific time period when a UE receives a UL-DL configuration.

Transmission of UL signaling may be stopped from a time point (indicated by (e) in FIG. 8) at which information for notifying the update of system information is first received, or may be a time point (indicated by (f) in FIG. 8) at which the updated UL-DL configuration is first received. Transmission of UL signaling based on a new UL-DL configuration may be stopped until a time point (indicated by (g) in FIG. 8) at which a new UL configuration is received. The UE may stop transmission of UL signaling for a duration C from (e) to (g). The UE may stop transmission of UL signaling for a duration D from (e) to (f). The UE may stop transmission of UL signaling for a duration E from a start of a modification period n+1 to (g). The UE may stop transmission of UL signaling for a duration F from a start of a modification period n+1 to (f). The UE may stop transmission of UL signaling during a modification period n+1.

The stopping of the UL signaling may also apply to a measurement. The UE performs the measurement periodically or non-periodically to measure quality of a DL channel. If a UL-DL configuration is changed, from which time point the updated UL-DL configuration will be applied is ambiguous to the UE, and thus a DL subframe which is an object to be measured is unclear.

Accordingly, as the change in the UL-DL configuration is received, it is proposed that the UE stops the measurement for a specific time duration.

The measurement may be stopped from a time point (e) at which information for notifying the update of system information is first received, or may be a time point (f) at which the updated UL-DL configuration is first received. The measurement may be stopped until a time point (g) at which a new measurement configuration is received. The UE may stop the measurement for a duration C from (e) to (g). The UE may stop the measurement for a duration D from (e) to (f). The UE may stop the measurement for a duration E from a start of a modification period n+1 to (g). The UE may stop the measurement for a duration F from a start of a modification period n+1 to (f). The UE may stop the measurement during the modification period n+1.

Optionally, the UE may perform the measurement in a subframe always allocated to DL (this is called a common DL subframe) even if the UL-DL configuration is changed. For example, a subframe having an index 0 or 5 in Table 1 may be a common DL subframe.

The UE may perform the measurement in the common DL subframe from a time point (e) at which information for notifying the update of system information is first received or a time point (f) at which the updated UL-DL configuration is first received. The measurement in the common DL subframe may be performed until a time point (g) at which a new measurement configuration is received. The UE may perform the measurement in the common DL subframe for a duration C from (e) to (g). The UE may perform the measurement in the common DL subframe for a duration D from (e) to (f). The UE may perform the measurement in the common DL subframe for a duration E from a start of a modification period n+1 to (g). The UE may perform the measurement in the common DL subframe for a duration F from a start of a modification period n+1 to (f). The UE may perform the measurement in the common DL subframe during the modification period n+1.

As the UL-DL configuration is changed, there is a need to change a configuration related to UL/DL transmission such as UL signaling or the like of the UE. As the UL-DL configuration is changed, a BS may pre-set a parameter to be changed to the UE by using an RRC message or the like. In addition, as the updated UL-DL configuration is received, the UE may apply the changed parameter.

The parameter may include any one of an SRS parameter, a parameter for PUCCH transmission, a parameter for a random access preamble, and a parameter for a CQI report.

The aforementioned embodiments of FIG. 6 to FIG. 8 may be applied independently or in combination. For example, the buffer refresh of FIG. 6 and the scheduling interruption of FIG. 7 may be applied together.

In the aforementioned embodiment, it is described an example in which the UL-DL configuration is modified by using an SIB for example. However, the UL-DL configuration may also be modified through cell-specific signaling or UE-specific signaling.

Figure 9:
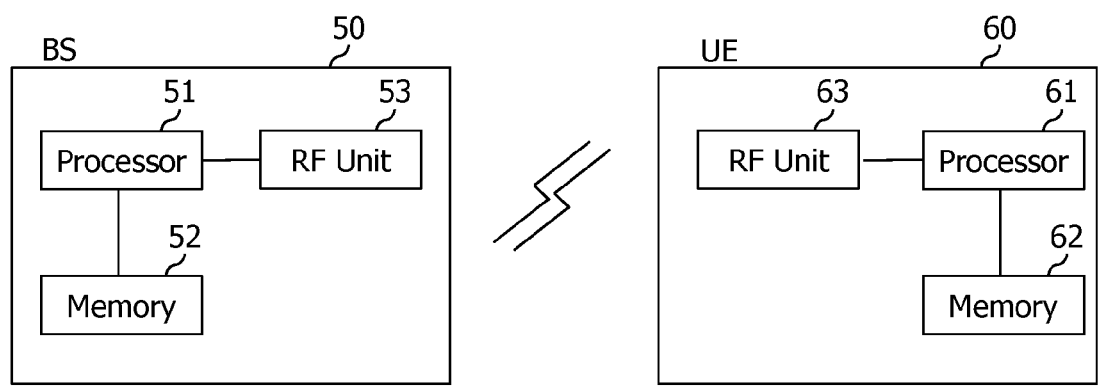
FIG. 9 is a block diagram of a wireless communication system according to an embodiment of the present invention.

FIG. 9 is a block diagram of a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiments, an operation of the BS may be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiments, an operation of the UE may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A communication method in a time division duplex (TDD) system, the communication method comprising:
   receiving, from a cell of a base station, a first uplink (UL)-downlink (DL) configuration for the cell indicating locations of one or more DL subframes and one or more UL subframes in a radio frame;
   receiving, from the cell of the base station, a second UL-DL configuration for the cell indicating locations of one or more DL subframes and one or more UL subframes in a radio frame;
   receiving a radio resource control (RRC) signal including a parameter to be applied as the second UL-DL configuration is configured,
   wherein the locations of the one or more DL subframes indicated by the second UL-DL configuration are the same as the locations of the one or more DL subframes indicated by the first UL-DL configuration;
   switching from a usage of the first UL-DL configuration to a usage of the second UL-DL configuration; and
   performing measurements on some or all of the one or more DL subframes indicated by the second UL-DL configuration,
   wherein the parameter is related to a physical uplink control channel (PUCCH), and the PUCCH includes a hybrid automatic repeat request (HARQ) positive-acknowledgement (ACK)/negative-acknowledgement (NACK).

2. The communication method of claim 1, further comprising:
   refreshing, upon receiving the second UL-DL configuration, a buffer for a hybrid automatic repeat request (HARQ) process, which has been performed based on the first UL-DL configuration.

3. The communication method of claim 2, wherein the buffer is refreshed when the second UL-DL configuration is received.

4. The communication method of claim 1, wherein the second UL-DL configuration is received in a pre-informed period.

5. The communication method of claim 1, further comprising:
   ignoring scheduling information received from the base station until the received second UL-DL configuration is applied.

6. The communication method of claim 1, further comprising:
   stopping a UL transmission until the received second UL-DL configuration is applied.

7. The communication method of claim 1, further comprising:
   transmitting a physical uplink control channel (PUCCH) including a hybrid automatic repeat request (HARQ) positive-acknowledgement (ACK)/negative-acknowledgement (NACK) based on the parameter.

8. The communication method of claim 7, wherein the HARQ ACK/NACK included in the PUCCH corresponds to the one or more DL subframes indicated by the second UL-DL configuration.

9. A user equipment in a time division duplex (TDD) system, the user equipment comprising:
   a radio frequency (RF) unit configured to transmit and receive a radio signal; and
   a processor operatively coupled to the RF unit, wherein the processor is configured to:
   receive, from a cell of a base station, a first uplink (UL)-downlink (DL) configuration for the cell indicating locations of one or more DL subframes and one or more UL subframes in a radio frame,
   receive, from the cell of the base station, a second UL-DL configuration for the cell indicating locations of one or more DL subframes and one or more UL subframes in a radio frame,
   receive a radio resource control (RRC) signal including a parameter to be applied as the second UL-DL configuration is configured,
   wherein the locations of the one or more DL subframes indicated by the second UL-DL configuration are the same as the locations of the one or more DL subframes indicated by the first UL-DL configuration,
   switch from a usage of the first UL-DL configuration to a usage of the second UL-DL configuration, and
   perform measurements on some or all of the one or more DL subframes indicated by the second UL-DL configuration,
   wherein the parameter is related to a physical uplink control channel (PUCCH), and the PUCCH includes a hybrid automatic repeat request (HARQ) positive-acknowledgement (ACK)/negative-acknowledgement (NACK).

10. The user equipment of claim 9, wherein the processor is further configured to refresh, upon receiving the second UL-DL configuration, a buffer for a hybrid automatic repeat request (HARQ) process, which has been performed based on the first UL-DL configuration.

11. The user equipment of claim 10, wherein the buffer is refreshed when the second UL-DL configuration is received.

12. The user equipment of claim 9, wherein the second UL-DL configuration is received in a pre-informed period.

* * * * *